(12) United States Patent
Abramczyk et al.

(10) Patent No.: US 11,084,451 B2
(45) Date of Patent: Aug. 10, 2021

(54) AIRBAG INCLUDING REINFORCING THREADS

(71) Applicant: Ford Global Technologies, LLC, Dearborn, MI (US)

(72) Inventors: Joseph Edward Abramczyk, Farmington Hills, MI (US); Zhibing Deng, Northville, MI (US); Jeffrey Charles Paddock, Dearborn Heights, MI (US); Deepak Patel, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 167 days.

(21) Appl. No.: 16/406,922

(22) Filed: May 8, 2019

(65) Prior Publication Data

US 2020/0353888 A1 Nov. 12, 2020

(51) Int. Cl.
*B60R 21/235* (2006.01)
*B60R 21/207* (2006.01)
*D03D 1/02* (2006.01)
*B60R 21/231* (2011.01)

(52) U.S. Cl.
CPC .......... *B60R 21/235* (2013.01); *B60R 21/207* (2013.01); *B60R 21/23138* (2013.01); *D03D 1/02* (2013.01); *B60R 2021/23146* (2013.01); *B60R 2021/23509* (2013.01); *B60R 2021/23533* (2013.01)

(58) Field of Classification Search
CPC ... B60R 20/235; B60R 20/233; B60R 20/206; B60R 20/207; B60R 20/23138; B60R 2021/23146; B60R 2021/23509; B60R 2021/23533; D03D 1/02
See application file for complete search history.

(56) References Cited

U.S. PATENT DOCUMENTS

| | | | | |
|---|---|---|---|---|
| 5,881,776 A | * | 3/1999 | Beasley, Jr. | B60R 21/235 139/389 |
| 6,429,155 B1 | * | 8/2002 | Li | B32B 27/02 280/728.1 |
| 6,455,449 B1 | * | 9/2002 | Veiga | B60R 21/235 280/728.1 |
| 6,734,125 B2 | * | 5/2004 | Veiga | B32B 27/04 139/384 R |
| 8,669,194 B2 | | 3/2014 | Kismir et al. | |

(Continued)

FOREIGN PATENT DOCUMENTS

JP 2000062563 A 2/2000
JP 2009127158 A 6/2009

*Primary Examiner* — Paul N Dickson
*Assistant Examiner* — Caitlin Anne Miller
(74) *Attorney, Agent, or Firm* — Frank A. MacKenzie; Bejin Bieneman PLC

(57) ABSTRACT

A vehicle includes a door, a seat spaced from the door, and an airbag supported by the seat and inflatable to an inflated position between the door and the seat. The airbag includes a plurality of first threads and a plurality of second threads being a different type of thread than the first threads. The airbag includes a first portion having the first threads interwoven with each other. The airbag includes a second portion having the second threads interwoven with the first threads. The second portion faces the door in the inflated position.

20 Claims, 8 Drawing Sheets

(56) References Cited

U.S. PATENT DOCUMENTS

| | | | | |
|---|---|---|---|---|
| 8,722,553 | B2 * | 5/2014 | Johansson | D03D 1/02 |
| | | | | 442/209 |
| 8,851,510 | B1 * | 10/2014 | Dinsdale | B60R 21/23138 |
| | | | | 280/730.2 |
| 9,738,995 | B2 * | 8/2017 | Hirsch | B60R 21/235 |
| 10,583,802 | B2 * | 3/2020 | Hirsch | B60R 21/235 |
| 10,800,373 | B2 * | 10/2020 | Lowe | A23B 9/26 |
| 2004/0029477 | A1 | 2/2004 | Rose, III et al. | |
| 2011/0210532 | A1 | 9/2011 | Johansson | |
| 2020/0307484 | A1 * | 10/2020 | Adler | B60R 21/207 |

* cited by examiner

AIRBAG INCLUDING REINFORCING THREADS

BACKGROUND

A vehicle may include one or more airbags deployable during a vehicle impact to control kinematics of occupants inside the vehicle during the impact. The airbag may be a component of an airbag assembly including a housing supporting the airbag, and an inflation device in communication with the airbag for inflating the airbag from an uninflated position to an inflated position.

DETAILED DESCRIPTION

Figure 1A:
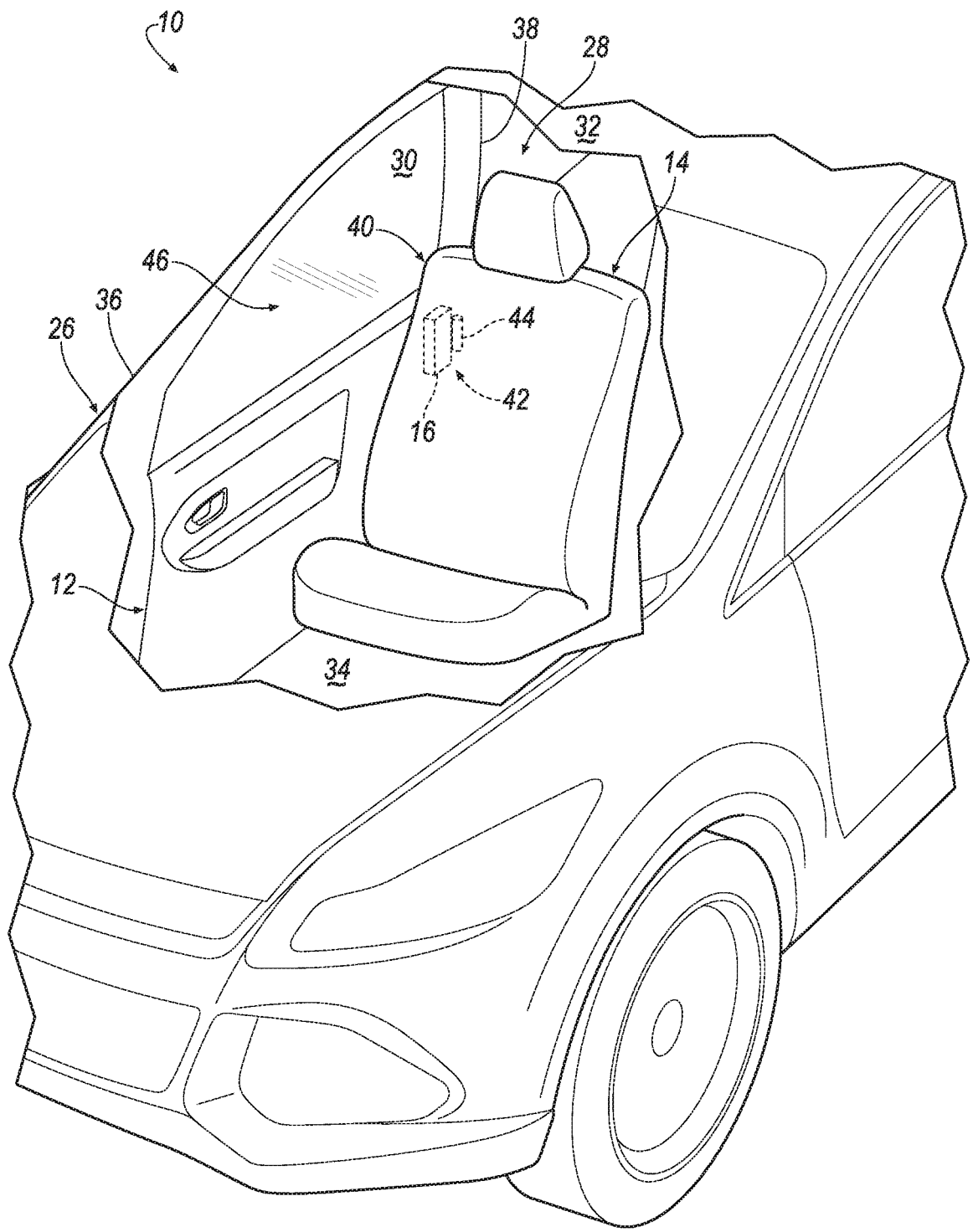
FIG. 1A is a perspective view of a vehicle including an airbag supported by a seat with the airbag in an uninflated position.

A vehicle includes a door, a seat spaced from the door, and an airbag supported by the seat and inflatable to an inflated position between the door and the seat. The airbag includes a plurality of first threads and a plurality of second threads being a different type of thread than the first threads. The airbag including a first portion having first threads interwoven with each other. The airbag includes a second portion having the second threads interwoven with the first threads. The second portion faces the door in the inflated position.

The door may include a window. The second portion may be disposed adjacent to the window in the inflated position.

The vehicle may include an inflator supported by the seat. The second portion may be in fluid communication with the inflator.

The plurality of first threads and the plurality of second threads may be the same material. The plurality of first threads and the plurality of second threads may be nylon.

The plurality of second threads may have a higher linear mass density than the plurality of first threads.

The plurality of first threads and the plurality of second threads may be a different material. The plurality of first threads may be nylon.

The plurality of second threads may have a higher linear mass density than the plurality of first threads.

The plurality of second threads may have a higher puncture resistance than the plurality of first threads.

The plurality of second threads may be para-aramid fibers.

The plurality of second threads may have a higher thermal resistance than the plurality of first threads.

The plurality of second threads may be meta-aramid fibers.

An airbag assembly includes an airbag including a plurality of first threads and a plurality of second threads being a different type of thread than the first threads. The airbag includes a first portion having the first threads interwoven with each other. The airbag includes a second portion having the second threads interwoven with the first threads.

The airbag assembly may include an inflator in fluid communication with the second portion.

The plurality of first threads and the plurality of second threads may be the same material. The plurality of first threads and the plurality of second threads may be nylon.

The plurality of second threads may have a higher linear mass density than the plurality of first threads.

The plurality of first threads and the plurality of second threads may be a different material. The plurality of first threads may be nylon.

The plurality of second threads may have a higher puncture resistance than the plurality of first threads.

The plurality of second threads may be para-aramid fibers.

The plurality of second threads may have a higher thermal resistance than the plurality of first threads.

The plurality of second threads may be meta-aramid fibers.

With reference to the Figures, wherein like numerals indicate like parts throughout the several views, a vehicle 10 is generally shown. The vehicle 10 includes a door 12, a seat 14 spaced from the door 12, and an airbag 16 supported by the seat 14 and inflatable to an inflated position between the door 12 and the seat 14. The airbag 16 includes a plurality of first threads 18 and a plurality of second threads 20 being a different type of thread than the first threads 18. The airbag 16 includes a first portion 22 having the first threads 18 interwoven with each other. The airbag 16 includes a second portion 24 having the second threads 20 interwoven with the first threads 18. The second portion 24 faces the door 12 in the inflated position.

Figure 1B:
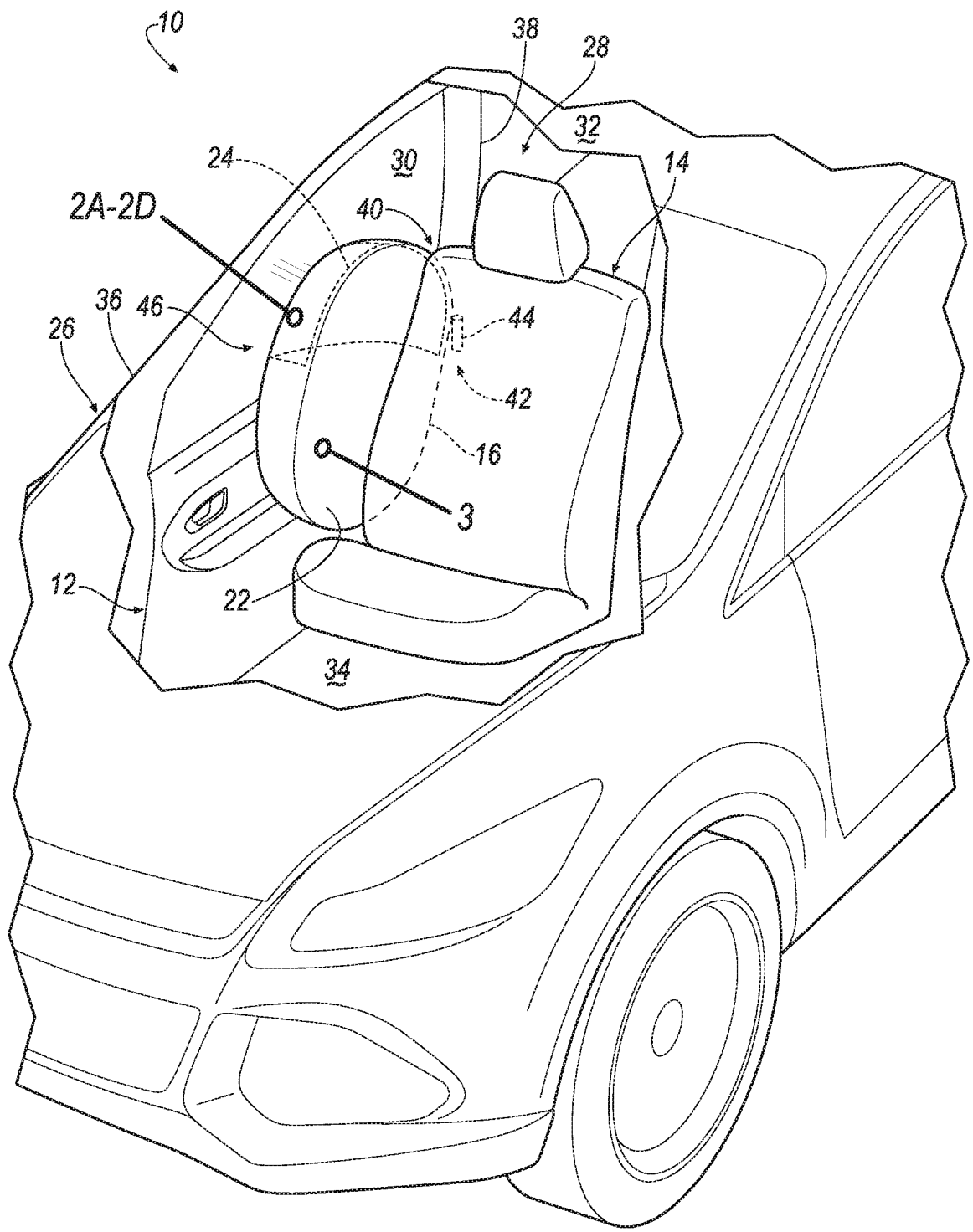
FIG. 1B is a perspective view of the vehicle including the airbag supported by the seat with the airbag in an inflated position.
Figure 4A:
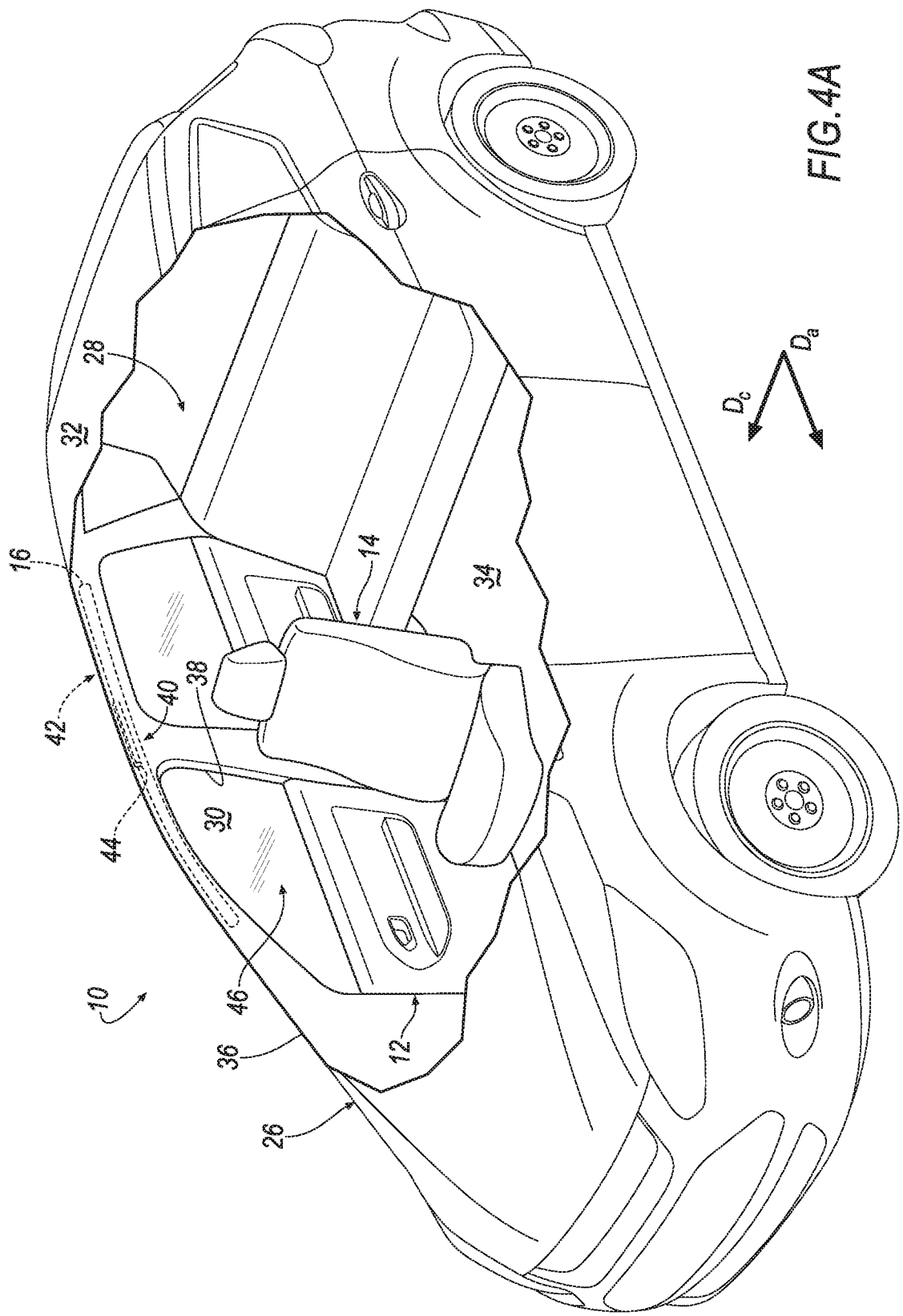
FIG. 4A is a perspective view of another embodiment of the vehicle including the airbag supported by a roof with the airbag in the uninflated position.
Figure 4B:
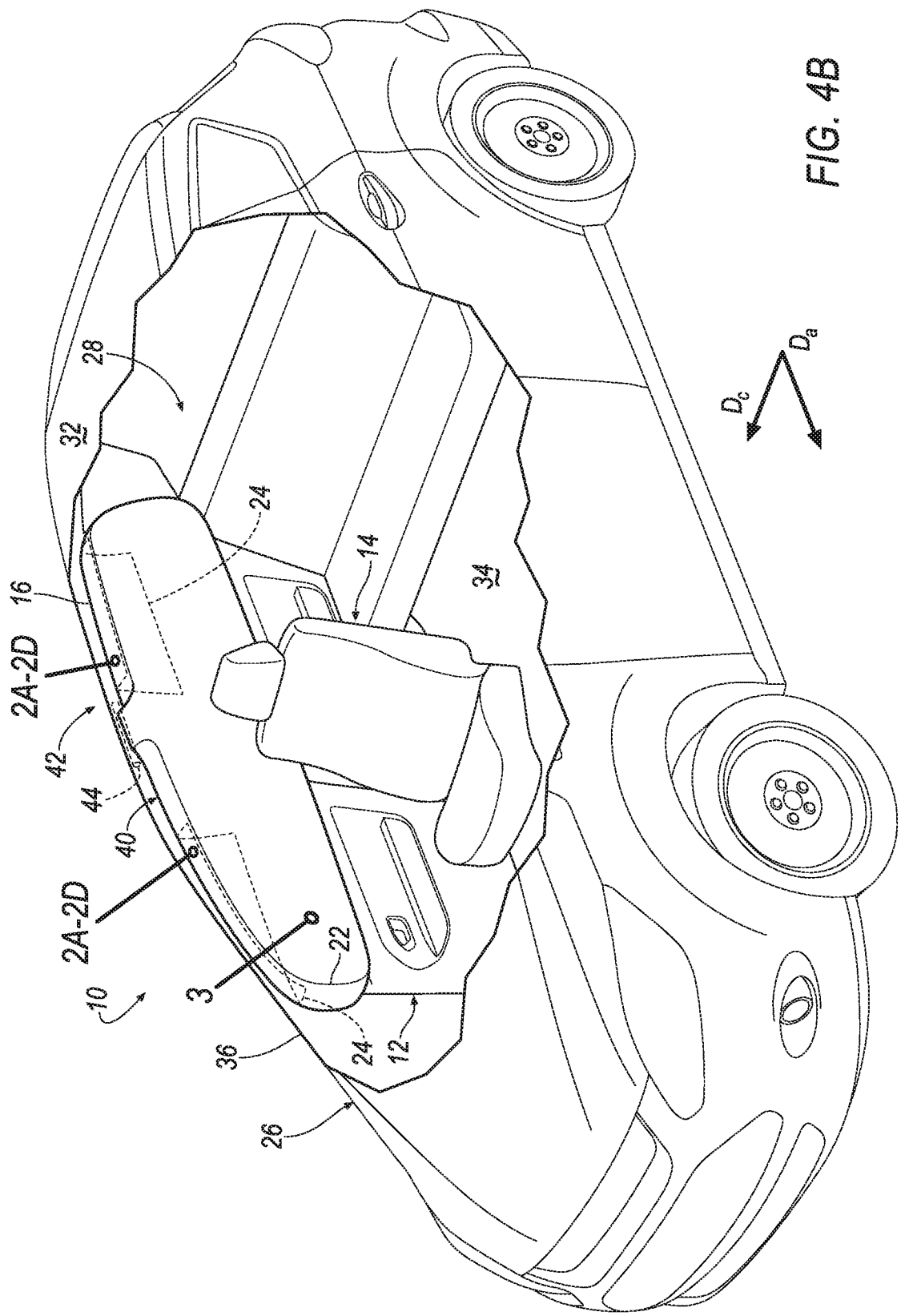
FIG. 4B is a perspective view of the vehicle including the airbag of FIG. 4A in the inflated position.

During a vehicle impact, the airbag 16 may be deployed from an uninflated position, as shown in FIGS. 1A and 4A, to the inflated position, as shown in FIGS. 1B and 4B. During the vehicle impact, the airbag 16 may provide coverage so as to control the kinematics of the occupant. During the vehicle impact, an occupant may be forced into the first portion 22 of the airbag 16 in the inflated position. The second threads 20 may, for example, reinforce the airbag 16 at areas that engage with vehicle components, e.g., a trim panel, a body panel, a glass, etc., when the airbag 16 is inflated and impacted by an occupant. In other words, the second threads 20 may reinforce the airbag 16 to resist deformation of the airbag 16 at the second portion 24. Said differently, the second threads 20 may provide localized areas of increased strength in the airbag 16. Since the second threads 20 are woven into the second portion 24, the second portion 24 may be limited to the areas engaged with vehicle components as opposed to the entire airbag, which may reduce the size of the airbag 16, e.g., to satisfy packaging constraints, and/or reduce the cost of the airbag 16.

The vehicle 10 may be any suitable type of automobile, e.g., a passenger or commercial automobile such as a sedan, a coupe, a truck, a sport utility vehicle, a crossover vehicle, a van, a minivan, a taxi, a bus, etc. The vehicle 10, for example, may be an autonomous vehicle. In other words, the vehicle 10 may be autonomously operated such that the vehicle 10 may be driven without constant attention from a driver, i.e., the vehicle 10 may be self-driving without human input.

With reference to FIGS. 1A, 1B, 4A and 4B, the vehicle 10 may include a body 26 defining a passenger cabin 28 to house occupants, if any, of the vehicle 10. The passenger cabin 28 may extend across the vehicle 10, i.e., from one side to the other side of the vehicle 10. The passenger cabin 28 includes a front end (not numbered) and a rear end (not numbered) with the front end being in front of the rear end during forward movement of the vehicle 10. The passenger cabin 28 includes one or more seats. The seats 14 may be arranged in any suitable arrangement. For example, one or more of the seats 14 may be at the front end of the passenger cabin 28, i.e., a front seat, and/or one or more of the seats 14 may be at the rear end of the passenger cabin 28, i.e., a rear seat. The position and orientation of the seats 14 and components thereof may be adjustable by an occupant.

With continued reference to FIGS. 1A, 1B, 4A and 4B, the body 26 may define one or more door openings (not numbered) on each side of the vehicle 10. For example, the body 26 may define a front door opening on each side of the vehicle 10 adjacent to the front end of the passenger cabin 28. Additionally, the body 26 may define a rear door opening on each side of the vehicle 10 spaced from the respective front door opening. For example, each rear door opening may be disposed adjacent to the rear end of the passenger cabin 28.

With continued reference to FIGS. 1A, 1B, 4A and 4B, the vehicle 10 may include one door 12 disposed in each respective door opening. Each door 12 may be rotatably attached to the body 26 in the respective door opening. Each door 12 may include a window 30 through which occupants of the passenger cabin 28 can see an external environment. Each window 30 may face laterally from the passenger cabin 28. The windows 30 may be any suitably durable transparent material, including glass such as laminated, tempered glass or plastic such as Plexiglas® or polycarbonate.

With reference to FIGS. 1A, 1B, 4A and 4B, the body 26 may include a roof 32 and a floor 34 spaced from the roof 32. The roof 32 and the floor 34 may each extend across the passenger cabin 28, i.e., from one side to the other side of the vehicle 10 and from the front end to the rear end of the passenger cabin 28. The roof 32 may define an upper boundary of the passenger cabin 28 and the floor 34 may define a lower boundary of the passenger cabin 28.

The vehicle 10 may include an instrument panel (not shown) disposed at a vehicle forward end of the passenger cabin 28. The instrument panel may support vehicle controls, including a steering wheel (not shown). The instrument panel may extend across the front end of the passenger cabin 28 from one side of the vehicle 10 to the other side of the vehicle 10.

The vehicle 10 may include a windshield (not shown) disposed at the front end of the passenger cabin 28 and extending above the instrument panel. The windshield may extend from one side of the vehicle 10 to the other side of the vehicle 10. The windshield may extend from the roof 32 to the instrument panel. The windshield may face in a forward direction from the passenger cabin 28. The windshield may be a same or different material as the windows 30. The windshield may be any suitably durable transparent material, including glass such as laminated, tempered glass or plastic such as Plexiglas® or polycarbonate.

With reference to FIGS. 1A, 1B, 4A and 4B, the body 26 may include an A-pillar 36 and a B-pillar 38 on each side of the vehicle 10. The A-pillars 36 may extend between the windshield and the windows 30 of the front doors 12. In other words, the A-pillars 36 may be disposed at the front end of the passenger cabin 28. The B-pillars 38 may extend behind the windows 30 of the front doors 12, e.g., between the windows 30 of adjacent doors 12. In other words, the B-pillars 38 may be spaced from the A-pillars 36, e.g., by the front door opening. The vehicle 10 may include additional pillars, e.g., C-pillars, D-pillars. The pillars 36, 38 may extend from the roof 32 towards the floor 34 of the vehicle 10.

The vehicle 10 may include a mounting surface 40 for supporting the airbag 16. The mounting surface 40 may be a rigid surface that supports the airbag 16 when the airbag 16 is in the inflated position. The mounting surface 40 may be any suitable surface in the vehicle 10. For example, the mounting surface 40 may be a seatback (not numbered) of the seat 14, as shown in FIGS. 1A and 1B. As another example, the mounting surface 40 may be the roof 32, as shown in FIG. 4A. As another example, the mounting surface 40 may be the instrument panel. As another example, the mounting surface 40 may be the steering wheel. In these examples, the airbag 16 may be inflatable from the mounting surface 40 towards the occupant.

The vehicle 10 includes an airbag assembly 42. The airbag assembly 42 includes the airbag 16 and an inflator 44. The vehicle 10 may include any suitable number of airbag assemblies. For example, the vehicle 10 may include at least one airbag assembly 42 for each front seat 14. In this situation, each airbag assembly 42 of the respective front seat 14 may include a different type of airbag. The airbag 16 may be any suitable type of airbag. For example, the airbag 16 may be a side airbag, as shown in FIGS. 1A and 1B. As another example, the airbag 16 may be a curtain airbag, as shown in FIGS. 4A and 4B. Alternatively, the airbag 16 may be e.g., a front seat passenger airbag, a driver airbag, a knee airbag, or any other suitable type of airbag.

Each airbag assembly 42 may be supported by one mounting surface 40. For example, as shown in FIGS. 1A and 1B, the seatback of the seat 14 may support the airbag assembly 42. As another example, as shown in FIGS. 4A and 4B, the roof 32 may support the airbag assembly 42. Specifically, the airbag assembly 42 may be mounted to the mounting surface 40. As one example, the airbag 16 may be directly mounted to the mounting surface 40. In this situation, the airbag 16 may include clips, fasteners, panels, etc. for attaching to the mounting surface 40. As another example, the airbag assembly 42 may include a base (not shown). The base may be fixed to the mounting surface 40. The airbag 16 may be supported by the base. The base may be flat. As another example, the base may include a cavity (not shown) that may house the airbag 16 in the uninflated position and may support the airbag 16 on the mounting surface 40 in the inflated position. The base may, for example, include clips, fasteners, panels, etc. for attaching the airbag 16 and for attaching the airbag assembly 42 to the mounting surface 40. The base may be of any material, e.g., a rigid polymer, a metal, a composite, etc.

The inflator 44 is in fluid communication with the airbag 16. The inflator 44 expands the airbag 16 with inflation medium, such as a gas, to move the airbag 16 from the uninflated position to the inflated position. The inflator 44 may be supported by any suitable component. For example, the inflator 44 may be supported by the mounting surface 40. In such an example, the inflator 44 may be supported by the seat 14, as shown in FIGS. 1A and 1B, or by the roof 32, as shown in FIGS. 4A and 4B. Alternatively, the inflator 44 may be supported by the base or any other suitable vehicle component. The inflator 44 may be, for example, a pyrotechnic inflator that ignites a chemical reaction to generate the inflation medium, a stored gas inflator that releases (e.g., by a pyrotechnic valve) stored gas as the inflation medium, or a hybrid. The inflator 44 may be, for example, at least partially in an inflation chamber of the airbag 16 to deliver inflation medium directly to the inflation chamber or may be connected to the inflation chamber through fill tubes, diffusers, etc. The airbag 16 may be a single continuous unit, e.g., a single piece of fabric. Alternatively, the airbag 16 may include a plurality of segments, i.e., two or more. The segments may be attached to each other in any suitable fashion, e.g., a plurality of panels attached by stitching, ultrasonic welding, etc.

The airbag 16 may define an inflation chamber (not shown), as set forth above. During inflation, the inflation chamber may be inflated from the uninflated position to the inflated position. The first portion 22 and the second portion 24 may, for example, each partially define the inflation chamber. Each portion 22, 24 of the airbag 16 may extend at least partially around the inflation chamber to the other portion 22, 24 of the airbag 16. The first portion 22 and the second portion 24 may define any suitable amount of the inflation chamber. The first portion 22 and the second portion 24 may define a same or a different amount of the inflation chamber. In other words, the first portion 22 and the second portion 24 may have any suitable size. Said differently, the first portion 22 and the second portion 24 each may be any suitable amount of a surface area of the airbag 16.

With reference to FIGS. 2A-2D and 3, the first portion 22 and the second portion 24 each include warp threads 48 and weft threads 50 interwoven with each other. The warp threads 48 may extend generally vertical in the inflated position. The warp threads 48 may extend along the entire height of the airbag 16. The warp threads 48 may be arranged next to each other between the sides of the airbag 16. The warp threads 48 identified in the Figures are for illustrative purposes and are not shown to scale. For example, the warp threads 48 may be thinner and closer together than shown, e.g., the warp threads 48 may have a higher thread count than shown.

With continued reference to FIGS. 2A-2D and 3, the weft threads 50 extend transverse to the warp threads 48. For example, the weft threads 50 may extend generally horizontal in the inflated position. The weft threads 50 may extend along the entire width of the airbag 16. The weft threads 50 may be arranged next to each other. The weft threads 50 identified in the Figures are for illustrative purposes only and are not shown to scale. For example, the weft threads 50 may be thinner and closer together than shown, e.g., the weft threads 50 may have a higher thread count than shown.

As set forth above, the first portion 22 includes the first threads 18 interwoven with each other. In the example shown in FIG. 3, the first threads 18 are the warp threads 48 and the weft threads 50 of the first portion 22.

Figure 2A:
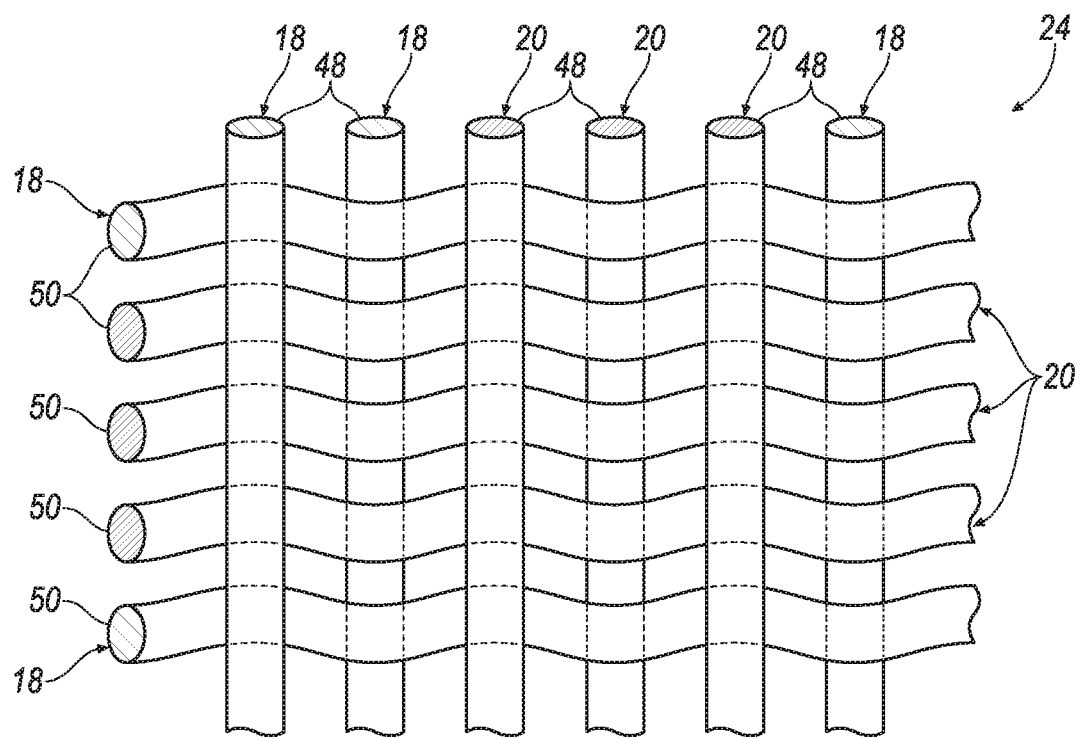
FIG. 2A is a magnified view of one embodiment of a second portion of the airbag including a plurality of second threads interwoven with a plurality of first threads.
Figure 2B:
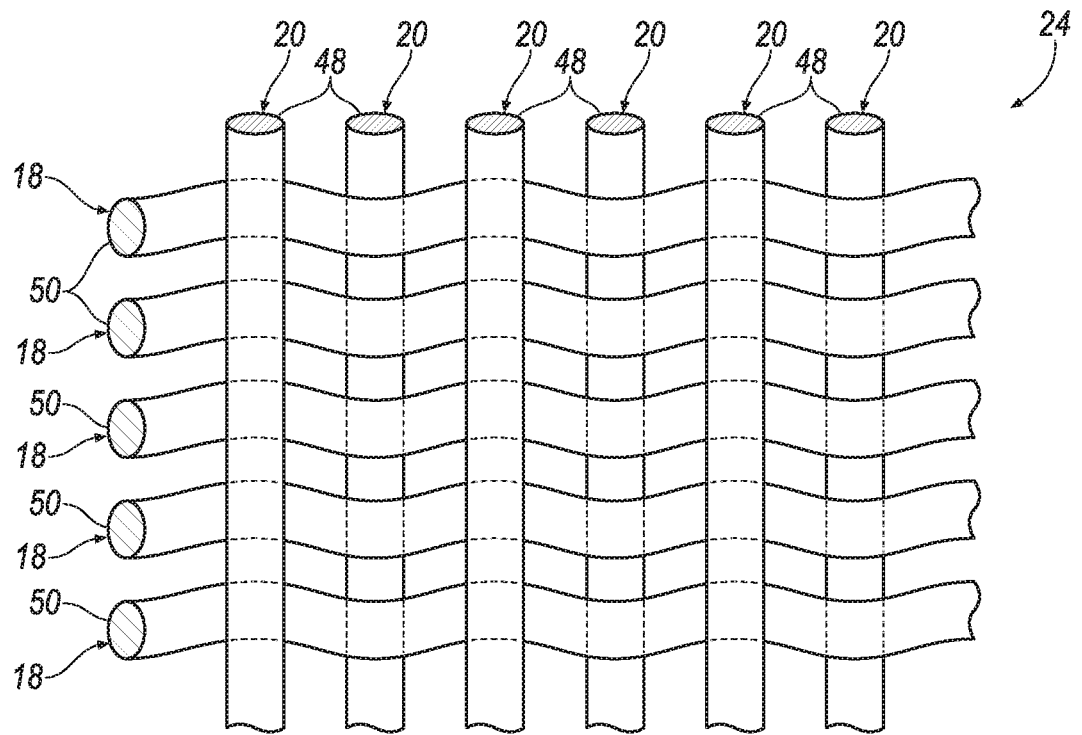
FIG. 2B is a magnified view of another embodiment of the second portion of the airbag including the plurality of second threads interwoven with the plurality of first threads.
Figure 2C:
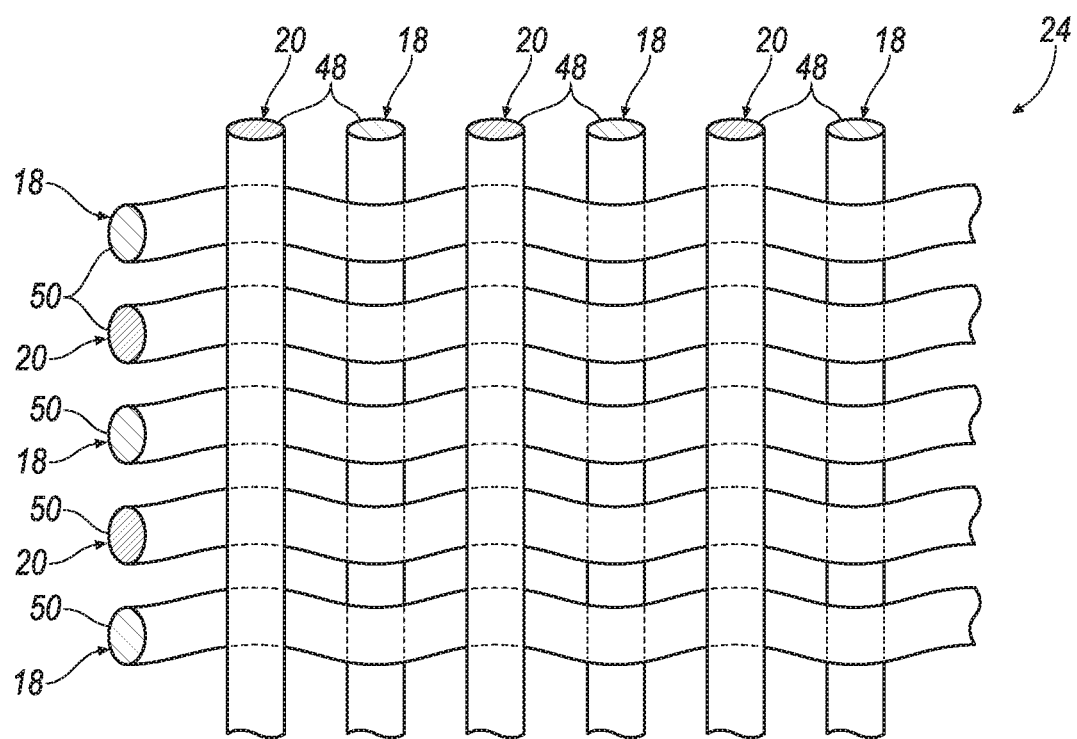
FIG. 2C is a magnified view of another embodiment of the second portion of the airbag including the plurality of second threads interwoven with the plurality of first threads.
Figure 2D:
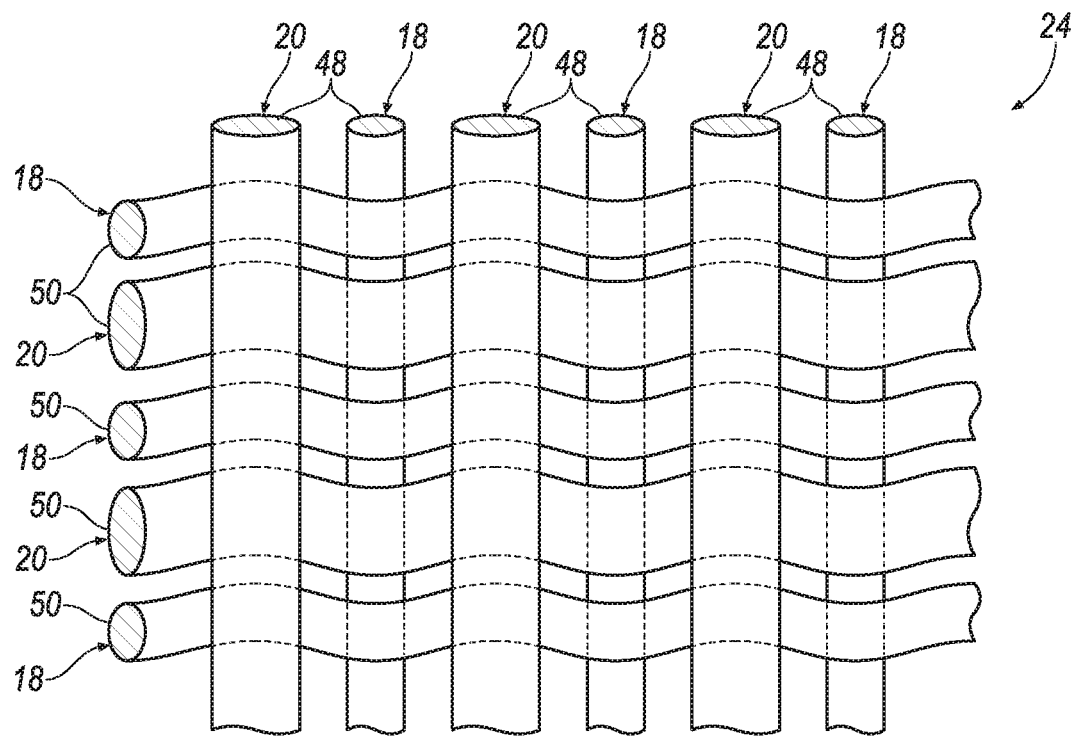
FIG. 2D is a magnified view of another embodiment of the second portion of the airbag including the plurality of second threads interwoven with the plurality of first threads.
Figure 3:
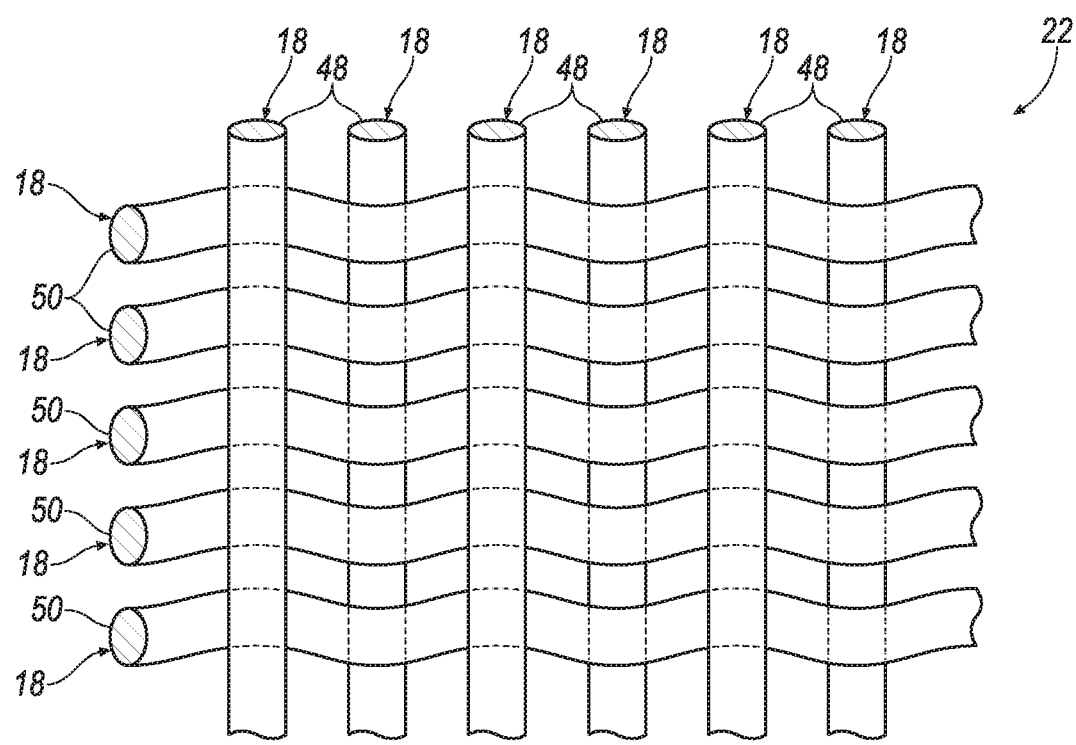
FIG. 3 is a magnified view of a first portion of the airbag including the plurality of first threads interwoven with each other.

As set forth above, the second portion 24 includes the second threads 20 interwoven with the first threads 18. The second portion 24 may have any suitable thread count, i.e., number of warp threads 48 and number of weft threads 50 per square inch. The second threads 20 are at least some of the warp threads 48 and/or at least some of the weft threads 50 of the second portion 24. Additionally, the first threads 18 are the rest of the warp threads 48 and/or the rest of the weft threads 50 of the second portion 24. The first threads 18 and the second threads 20 each may be any suitable number of warp threads 48 and/or weft threads 50. In other words, the first threads 18 and the second threads 20 may be any suitable combination of warp threads 48 and weft threads 50. As one example, the second threads 20 may be all of the warp threads 48 of the second portion 24 and the first threads 18 may be all of the weft threads 50 of the second portion 24, as shown in FIG. 2B. As another example, the second threads 20 may be all of the weft threads 50 of the second portion 24 and the first threads may be all of the warp threads 48 of the second portion 24. As yet another example, the second threads 20 and the first threads 18 each may be some of the warp threads 48 and some of the weft threads 50 of the second portion 24, as shown in FIGS. 2A, 2C, and 2D. As yet another example, the second threads 20 may be all of the warp threads 48 and some of the weft threads 50 of the second portion 24. In such an example, the first threads 18 are the rest of the weft threads 50 of the second portion 24. As yet another example, the second threads 20 may be some of the warp threads 48. In such an example, the first threads 18 are all of the weft threads 50 and the rest of the warp threads 48 of the second portion 24.

The second threads 20 and the first threads 18 may be interwoven in any suitable manner in the second portion 24. For example, the second threads 20 may be consecutive threads, as shown in FIGS. 2A and 2B. In other words, the airbag 16 may lack first threads 18 disposed between adjacent second threads 20. As another example, first threads 18 may be disposed between adjacent second threads 20. Any suitable number of first threads 18 may be disposed between adjacent second threads 20. For example, the second threads 20 and the first threads 18 may alternate, i.e., only one thread is disposed between adjacent second threads 20, as shown in FIGS. 2C and 2D. As another example, a first threads 18 may be disposed between adjacent second threads 20.

As set forth above, the second threads 20 are a different type of thread than the first threads 18. For example, the second threads 20 may be a different material than the first threads 18, as shown in FIGS. 2A-2C and discussed further below. Additionally, or alternatively, the second threads 20 may have a higher linear mass density than the first threads 18, as shown in FIG. 2D and discussed further below. Since the second threads 20 are a different type of thread than the first threads 18, physical properties, e.g., thermal resistance, puncture resistance, etc., of the second portion 24 are different than physical properties of the first portion 22 of the airbag 16.

The first threads 18 may be any suitable type of material, e.g., from a woven polymer. For example, the airbag 16 may be woven nylon, e.g., nylon 6,6. Other suitable examples include polyether ether ketone (PEEK), polyetherketoneketone (PEKK), polyester, or any other suitable polymer. The woven polymer may include a coating such as silicone, neoprene, urethane, polyorganosiloxane, etc.

The second threads 20 may be any suitable material. The second threads 20 may be a same or a different material than the first threads 18. As one example, the first threads 18 and the second threads 20 may be woven nylon. In such an example, the second threads 20 may have a higher linear mass density than the first threads 18, as shown in FIG. 2D. In other words, the second threads 20 may be thicker than the first threads 18. For example, the first threads 18 may be woven nylon with a linear mass density of 585 deniers and the second threads 20 may be woven nylon with a linear mass density of 700 deniers.

As another example, the second threads 20 may be a different material than the first threads 18, as shown in FIGS. 2A-2C. In such an example, the second threads 20 may be any suitable type of material. For example, the second threads 20 may be para-aramid fibers, e.g., Kevlar®, meta-aramid fibers, e.g., Nomex®, or any other suitable type of material. In this situation, the second threads 20 may have any suitable linear mass density. The second threads 20 may have a same or different linear mass density as the first threads 18. For example, the second threads 20 may have a same linear mass density as the first threads 18 when the second threads 20 are a different material than the first threads 18. Alternatively, the second threads 20 may have a higher linear mass density than the first threads 18 when the second threads 20 are a different material than the first threads 18.

The second threads 20 reinforce the first threads 18 in the second portion 24 of the airbag 16. In other words, the second threads 20 may resist deformation more than the first threads 18. For example, the second portion 24 may have a higher puncture resistance than the first portion 22. In this situation, the second threads 20 may, for example, be para-aramid fibers. In such an example, the second threads 20 may resist tearing or puncturing of the second portion 24 of the airbag 16 during inflation and/or in the inflated position, e.g., from windows 30 broken during a vehicle impact, edges of trim panels, etc., more than the first threads 18. As another example, the second portion 24 may have a higher thermal resistance than the first portion 22. In this situation, the second threads 20 may, for example, be meta-aramid fibers. In such an example, the second threads 20 may resist melting of the second portion 24 of the airbag 16 due to heat exhausted during inflation, e.g., from the inflator 44, more than the first threads 18.

Specifically, the second portion 24 is disposed adjacent to an inflation stressor 46. In other words, the second portion 24 may engage, i.e., be positioned to receive, the inflation stressor 46 during inflation and/or in the inflated position. The inflation stressor 46 may be a stress potentially severe enough to deform the airbag 16 during inflation and/or in the inflated position. The inflation stressor 46 may be any type of stress. For example, the inflation stressor 46 may be a mechanical stress. In this situation, the inflation stressor 46 may be a reaction surface. The airbag 16 may be disposed between the occupant and the reaction surface. When the airbag 16 is in the inflated position, the reaction surface may provide a counteracting force against the airbag 16 when the airbag 16 is impacted by the occupant such that the airbag 16 is squeezed between the occupant and the reaction surface. In such an example, the mechanical stress may be from the airbag 16 impacting the reaction surface, e.g., edges of trim panels, fasteners, glass, etc. The reaction surface may be any suitable surface in the vehicle 10. For example, the reaction surface may be the door 12, and specifically, the window 30, as shown in FIGS. 1B and 4B. In this situation, the second portion 24 may be disposed adjacent to the window 30 of the door 12 in the inflated position. In such an example, the second threads 20 reinforce the second portion 24 to resist tearing or puncturing to the airbag 16 during a vehicle impact, e.g., from broken glass, edges of trim panels, etc. impacting the airbag 16. Alternatively, the reaction surface may be, e.g., the windshield, the instrument panel, the steering wheel, a trim panel, etc.

Additionally, or alternatively, the inflation stressor 46 may be a thermal stress, e.g., from the inflator 44 exhausting heat, friction from portions of the airbag 16 unfolding, etc., during inflation. For example, the second portion 24 may be disposed adjacent to the inflator 44. In this situation, the inflator 44 is in fluid communication with the second portion 24. Specifically, the inflator 44 may exhaust heat towards the second portion 24 during inflation. In such an example, the second threads 20 may resist melting of the second portion 24 of the airbag 16 from the increased heat exhausted on the airbag 16 during inflation.

The airbag 16 may include any suitable number of second portions 24. For example, the airbag 16 may include one second portion 24 engageable with each respective inflation stressor 46. As another example, the airbag 16 may include one second portion 24 engageable with multiple inflation stressors 46.

The airbag 16 may include one or more internal components, e.g., tethers, diffusers, etc. The internal components may be, e.g., attached to the second portion 24, disposed adjacent to the second portion 24, disposed between the second portion 24 and the inflator 44, etc. In these situations, the internal components may be subjected to the stress of the inflation stressor 46, e.g., a thermal stress. The internal components may include the second threads 20 interwoven with the first threads 18 similar to the second portions 24. In other words, the internal components may include second threads 20, which may reinforce the internal components to reduce deformation of the internal components during inflation.

The first portion 22 of the airbag 16 may be spaced from the inflation stressor 46, e.g., during inflation and/or in the inflated position. In other words, the inflation stressor 46 may not engage the first portion 22 of the airbag 16 during inflation and/or in the inflated position. For example, the first portion 22 of the airbag 16, in the inflated position, may face an intended occupant, e.g., the occupant of a seat, as shown in FIGS. 1A, 1B, 4A and 4B. In this situation, the first portion 22 of the airbag 16 may be positioned to receive and be impacted by the occupant when the airbag 16 is inflated during an impact that urges the occupant toward the airbag 16.

Figure 5:
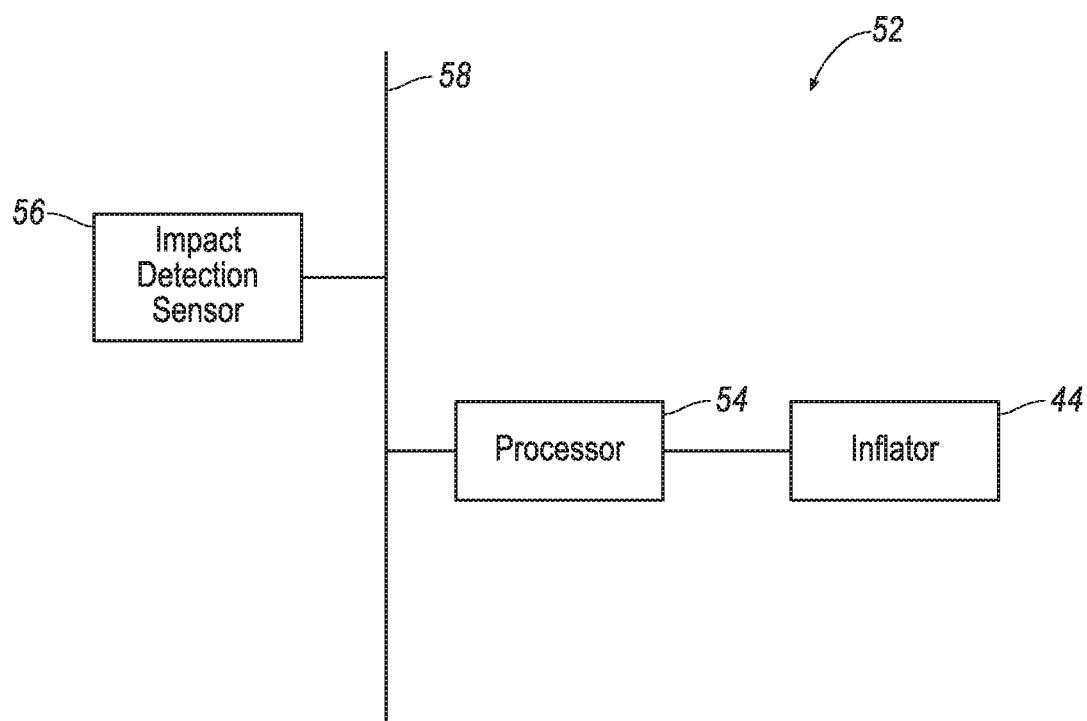
FIG. 5 is a block diagram of an inflation system of the vehicle

With reference to FIG. 5, the vehicle 10 may include an inflation system 52 having a computer. The computer may be a microprocessor-based computing device implemented via circuits, chips, or other electronic components. For example, the computer may include a processor 54, memory, etc. The memory may store instructions executable by the processor 54 and the processor 54 may read the instructions from the memory and execute the instructions. The processor 54 may be programmed to initiate an inflation of the airbag 16 in response to the vehicle impact.

The vehicle 10 may include impact detection sensors 56 programmed to detect the vehicle impact to the vehicle 10. The impact detection sensors 56 may be disposed in the vehicle 10. The impact detection sensors 56 may be of various types, e.g., pressure sensor, acceleration sensor, vision sensor, etc. When the vehicle impact occurs, the processor 54 may receive one or more signals from the impact detection sensors 56 indicating the vehicle impact. In response to receiving the signals from the impact detection sensors 56, the processor 54 may initiate the inflation of the airbag 16. Alternatively, the processor 54 may initiate the inflation of the airbag 16 selectively based on information from the impact detection sensors 56 identifying the physical characteristics of the vehicle impact, e.g., which side of the vehicle 10 impacted, amount of pressure applied to the vehicle 10, etc. and also seat occupancy information, e.g., by using the occupancy sensors disposed inside the seats 14 sensing the occupancy status of the seats 14.

In order to receive the signals from the sensors, e.g., the impact detection sensors 56, and to initiate the inflation of the airbag 16, the processor 54 communicates with the sensors, e.g., the impact detection sensors 56, and the inflator 44, e.g., through a direct electrical wiring, through which an analog or a digital signal is transmitted, or through a communication network 58 like CAN (Control Area Network), Ethernet, LIN (Local Interconnect Network) or any other way.

Computing devices, such as the computer, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In operation, the airbag 16 is in the uninflated position, under normal operating conditions of the vehicle 10. In the event of a vehicle impact, the impact detection sensors 56 detect the impact. The impact detection sensors 56 transmit a signal indicating the vehicle impact collision through the communication network 58 to the computer. When the vehicle impact is detected, the computer transmits a signal through the communication network 58 triggering the inflator 44 to inflate the airbag 16 with inflation medium from the uninflated position to the inflated position. When the inflator 44 inflates the airbag 16 to the inflated position, the inflation medium flows into the inflation chamber, increasing the pressure in the inflation chamber. As the pressure is increased in the inflation chamber, the airbag 16 extends away from the mounting surface 40. During inflation, one or more inflation stressors 46 may engage one or more second portions 24 of the airbag 16. In this situation, the second threads 20 may reinforce the second portion 24 of the airbag 16 to resist deformation to the airbag 16. In other words, the second threads 20 may reinforce the airbag 16 in areas, e.g., the second portion 24, subjected to an increase stress as compared to other areas, e.g., the first portion 22, of the airbag 16 during inflation and/or in the inflated position.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
a door;
a seat spaced from the door;
an airbag supported by the seat and inflatable to an inflated position between the door and the seat;
the airbag including a plurality of first threads and a plurality of second threads being a different type of thread than the first threads;
the airbag including a first portion having only the first threads interwoven with each other;
the airbag including a second portion having the second threads interwoven with the first threads, the second portion faces the door in the inflated position; and
the second portion including warp threads and weft threads, the second threads being one of all the warp threads or all the weft threads of the second portion.

2. The vehicle of claim 1, wherein the door includes a window, the second portion is disposed adjacent to the window in the inflated position.

3. The vehicle of claim 1, further comprising an inflator supported by the seat, the second portion is in fluid communication with the inflator.

4. The vehicle of claim 1, wherein the plurality of first threads and the plurality of second threads are the same material, the plurality of first threads and the plurality of second threads being nylon.

5. The vehicle of claim 4, wherein the plurality of second threads have a higher linear mass density than the plurality of first threads.

6. The vehicle of claim 1, wherein the plurality of first threads and the plurality of second threads are a different material, the plurality of first threads being nylon.

7. The vehicle of claim 6, wherein the plurality of second threads have a higher linear mass density than the plurality of first threads.

8. The vehicle of claim 6, wherein the plurality of second threads have a higher puncture resistance than the plurality of first threads.

9. The vehicle of claim 8, wherein the plurality of second threads are para-aramid fibers.

10. The vehicle of claim 6, wherein the plurality of second threads have a higher thermal resistance than the plurality of first threads.

11. The vehicle of claim 10, wherein the plurality of second threads are meta-aramid fibers.

12. An airbag assembly comprising:
an airbag including a plurality of first threads and a plurality of second threads being a different type of thread than the first threads;
the airbag including a first portion having only the first threads interwoven with each other;
the airbag including a second portion having the second threads interwoven with the first threads; and
the second portion including warp threads and weft threads, the second threads being one of all the warp threads or all the weft threads of the second portion.

13. The airbag assembly of claim 12, further comprising an inflator in fluid communication with the second portion.

14. The airbag assembly of claim 12, wherein the plurality of first threads and the plurality of second threads are the same material, the plurality of first threads and the plurality of second threads being nylon.

15. The airbag assembly of claim 14, wherein the plurality of second threads have a higher linear mass density than the plurality of first threads.

16. The airbag assembly of claim 12, wherein the plurality of first threads and the plurality of second threads are a different material, the plurality of first threads being nylon.

17. The airbag assembly of claim 16, wherein the plurality of second threads have a higher puncture resistance than the plurality of first threads.

18. The airbag assembly of claim 17, wherein the plurality of second threads are para-aramid fibers.

19. The airbag assembly of claim 16, wherein the plurality of second threads have a higher thermal resistance than the plurality of first threads.

20. The airbag assembly of claim 19, wherein the plurality of second threads are meta-aramid fibers.

* * * * *